United States Patent
Noel

(10) Patent No.: US 12,342,037 B2
(45) Date of Patent: *Jun. 24, 2025

(54) METHODS AND SYSTEMS FOR MEDIA CONTENT ITEM COMPARISON

(71) Applicant: Melodie Noel, Norcross, GA (US)

(72) Inventor: Melodie Noel, Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/508,783

(22) Filed: Nov. 14, 2023

(65) Prior Publication Data

US 2024/0196047 A1 Jun. 13, 2024

Related U.S. Application Data

(63) Continuation of application No. 17/167,881, filed on Feb. 4, 2021, now Pat. No. 11,871,076.

(60) Provisional application No. 62/970,003, filed on Feb. 4, 2020.

(51) Int. Cl.
*H04N 21/439* (2011.01)
*G06F 16/68* (2019.01)
*G06F 16/683* (2019.01)
*H04N 21/81* (2011.01)

(52) U.S. Cl.
CPC ....... *H04N 21/4394* (2013.01); *G06F 16/683* (2019.01); *G06F 16/686* (2019.01); *H04N 21/8106* (2013.01)

(58) Field of Classification Search
CPC ........... H04N 21/4394; H04N 21/8106; H04N 21/26258; G06F 16/683; G06F 16/686; G06F 17/30053; G06F 16/4387; G06F 16/639

See application file for complete search history.

(56) References Cited

U.S. PATENT DOCUMENTS

| | | | |
|---|---|---|---|
| 6,545,209 B1 | 4/2003 | Flannery et al. | |
| 2009/0198732 A1 | 8/2009 | Ross et al. | |
| 2010/0287071 A1* | 11/2010 | Shah | G06Q 30/0603 705/26.25 |
| 2013/0073362 A1* | 3/2013 | Panzironi | G06Q 30/06 705/14.19 |
| 2014/0280241 A1 | 9/2014 | Reblitz-Richardson et al. | |
| 2014/0281977 A1* | 9/2014 | Schupak | G06F 16/4387 715/716 |

OTHER PUBLICATIONS

U.S. Appl. No. 17/167,881 (2021/0243492), filed Feb. 4, 2021 (Aug. 5, 2021), Melodie Noel.

* cited by examiner

*Primary Examiner* — Fan S Tsang
*Assistant Examiner* — David Siegel
(74) *Attorney, Agent, or Firm* — Ballard Spahr LLP

(57) ABSTRACT

Methods and systems are described for determining characteristics of a content item. The characteristics of multiple content items may be compared to determine a winning content item(s).

20 Claims, 12 Drawing Sheets

| Genre | Sub-Genre | Weights | | | | | | | Average Scores | | | | | | | Total Average Score |
|---|---|---|---|---|---|---|---|---|---|---|---|---|---|---|---|---|
| | | acousticness | danceability | energy | instrumentalness | liveness | speechiness | valence | acousticness | danceability | energy | instrumentalness | liveness | speechiness | valence | sum |
| Dance | Techno | 6% | 21% | 20% | 15% | 17% | 14% | 6% | 0.191304348 | 0.67826087 | 0.640579971 | 0.498550725 | 0.55652 | 0.446376812 | 0.2087 | 3.22029 |
| Dance | Trance | 7% | 21% | 20% | 16% | 17% | 12% | 8% | 0.246376812 | 0.766521739 | 0.724637681 | 0.562318841 | 0.6 | 0.437681159 | 0.28116 | 3.60869 |
| Dance | Trap | 7% | 16% | 23% | 9% | 21% | 18% | 7% | 0.223188406 | 0.510144928 | 0.750724638 | 0.304347826 | 0.68998 | 0.594202899 | 0.21739 | 3.28985 |
| Disney | N/A | 17% | 12% | 12% | 14% | 16% | 18% | 11% | 0.510144928 | 0.362318841 | 0.379710145 | 0.431884058 | 0.48985 | 0.568115942 | 0.33913 | 3.08115 |
| Easy Listening | Bop | 21% | 24% | 12% | 4% | 5% | 11% | 23% | 0.631884058 | 0.721739130 | 0.359420290 | 0.121739130 | 0.13333 | 0.321739130 | 0.66957 | 2.95942 |
| Easy Listening | Lounge | 9% | 23% | 12% | 22% | 10% | 8% | 16% | 0.368115942 | 0.944927536 | 0.507246377 | 0.881159420 | 0.39710 | 0.342028986 | 0.64058 | 4.08115 |
| Easy Listening | Swing | 23% | 13% | 2% | 14% | 23% | 15% | 11% | 0.933333333 | 0.533333333 | 0.078260870 | 0.571014493 | 0.94202 | 0.614492754 | 0.47536 | 4.14782 |

| SONG TITLE | LUX AURUMQUE |
|---|---|
| GENRE | CLASSICAL - CHORAL |
| RELEASED | 1/1/2010 |
| POPULARITY | 45 |
| SONG_ID | XK31K455UYT |

| CHARACTERISTIC | SCORE | WEIGHT |
|---|---|---|
| ACOUSTICNESS | 0.986 | 32% |
| DANCEABILITY | 0.0783 | 0% |
| ENERGY | 0.0262 | 0% |
| INSTRUMENTALNESS | 0.964 | 27% |
| LIVENESS | 0.11 | 1% |
| SPEECHINESS | 0.0489 | 6% |
| VALENCE | 0.0241 | 0% |

| song | acousticness | danceability | energy | instrumentalness | liveness | speechiness | valence |
|---|---|---|---|---|---|---|---|
| Lux Aurumque | 0.986 | 0.0783 | 0.0262 | 0.964 | 0.11 | 0.0489 | 0.0241 |
| Firestone (feat. Conrad Sewell) | 0.408 | 0.486 | 0.652 | 0.0000663 | 0.077 | 0.052 | 0.391 |

| Weight | | | | | | | |
|---|---|---|---|---|---|---|---|
| Classical | | 32% | 0% | 0% | 27% | 1% | 6% | 0% |
| Dance (EDM – Electronic Dance Music) | Trance | 4% | 13% | 12% | 9% | 10% | 7% | 5% |

| | | Popularity | Year | Streams |
|---|---|---|---|---|
| Winner | Lux Aurumque | 0.878280699 | 45 | 1/1/2010 |
| 2nd Place Winner | Firestone (feat. Conrad Sewell) | 0.310346476 | 30 | 5/24/2015 |

FIG. 6

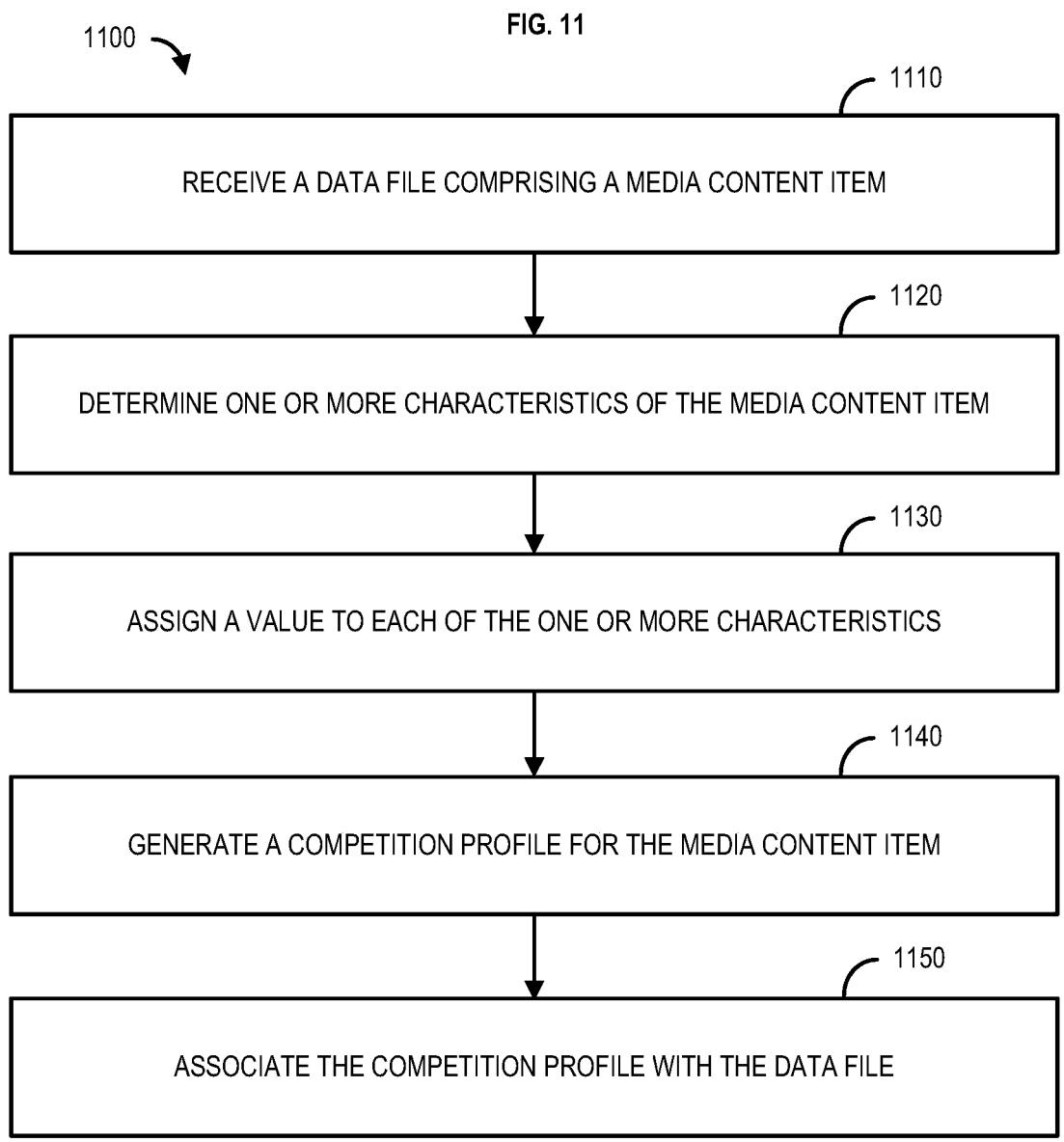

METHODS AND SYSTEMS FOR MEDIA CONTENT ITEM COMPARISON

CROSS-REFERENCE TO RELATED APPLICATIONS

This application is a continuation of U.S. patent application Ser. No. 17/167,881, filed Feb. 4, 2021, which claims benefit of U.S. Provisional Application No. 62/970,003, filed Feb. 4, 2020, which are hereby incorporated by reference in their entirety.

BACKGROUND

Music and sound have always played the background in video games, sports, television, movies and various entertainment outlets. Outside of the charts that measure album sales, streams and air play, there are no measuring instruments designed to compare songs based on their composition and attributes. However, there is presently no way to actively engage in the music in a competitive sense.

SUMMARY

It is to be understood that both the following general description and the following detailed description are exemplary and explanatory only and are not restrictive or intended to be limiting. Methods and systems for comparing media content items are described herein. Content may be selected for comparison. The content may comprise audio or video or other content. A game engine may compare the content based on one or more compositions, attributes, characteristics, parameters or the like. Such terms may be used interchangeably. In some embodiments, characteristics of songs such as danceability, speechiness, or the like may be compared. A gaming engine may generate a competition profile of a piece of content based on, for example, characteristics or attributes of the content. The gaming engine may assign values to the one or more compositions, attributes, characteristics, parameters or the like. The gaming engine may compare or rank the content based on the competition profiles of one or more pieces of content. The systems and methods described will dig deep into the science of creating a hits by measuring past hits, near hits and total misses. By using similar opposition tactics implemented in video games, songs will be subject to victory and defeat in a realm yet to be explored by the entertainment industry. Machine learning and AI technologies will play a major role in future development and will ultimately help participants develop a sharper ear for musical characteristics.

This summary is not intended to identify critical or essential features of the disclosure, but merely to summarize certain features and variations thereof. Other details and features will be described in the sections that follow.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is an example of a weighting strategy;
FIG. 5 is an example of a competition profile;
FIG. 6 is an example of a result of a comparison of content items;
FIG. 11 shows an block diagram of an example method.

DETAILED DESCRIPTION

Figure 1:
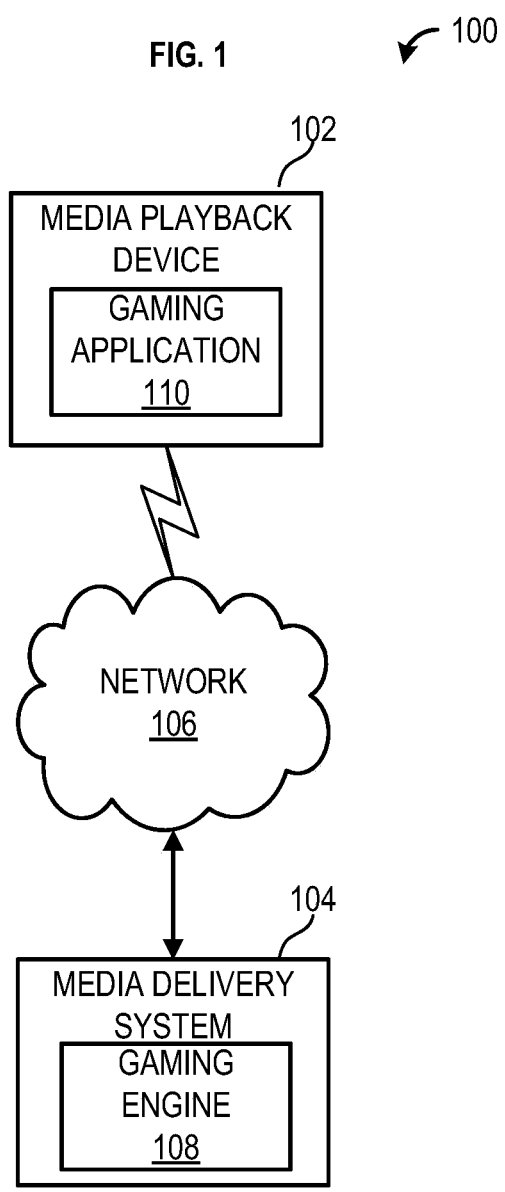
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is to be understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram depicting non-limiting examples of a system 100 comprising a media playback device 102 and a media delivery system 104 connected through a network 106. The media delivery system 104 can comprise one or multiple computers configured to operate a gaming engine 108. The media playback device 102 can comprise one or multiple computers configured to operate a game application 110 such as, for example, a laptop computer, a desktop computer, a mobile phone (e.g., smartphone), a tablet, and the like. Multiple media playback devices 102 can connect to the media delivery system 104 through the network 106 such as, for example, the Internet. A user of the media playback device 102 may connect to the gaming engine 108 with the game application 110. In an aspect, the gaming engine 108 may be resident within the game application 110. Accordingly, the media delivery system 104 may be configured to provide updates to the game application 110 and the gaming engine 108 resident within the game application 110.

The gaming engine 108 can be configured as a content streaming platform (e.g., music, movies, television shows, and the like). For purposes of illustration the present disclosure will use songs as an example. The gaming engine 108 may be configured to store content and/or store one or more identifiers to another location where the content is stored. The gaming engine 108 may be configured to allow creation of one or more playlists of content. A playlist of content may be a list, ordered or unordered, of one or more songs, movies, television shows, combinations thereof, and the like. The gaming engine 108 may be configured to determine one or more characteristics of a song and determine a value for each of the one or more characteristics. For example, the song may be associated with metadata indicating the one or more characteristics of the song. For example, a third party external to the system may determine the metadata comprising the one or more characteristics and associate the metadata with the song. Examples of third party's external to the system may include Spotify®, iTunes®, Zune® or other media services. The gaming engine 108 may be configured to generate, based on the determined values of the one or more characteristics, a competition profile for the song. In that way, a playlist may be created wherein each song has an associated competition profile. The gaming engine 108 may be configured to compare two or more songs by comparing the competition profiles associated with each of the two or more songs. For example, a first song may be associated with a first characteristic (e.g., danceability) having a first value while the second song may be associated with the first characteristics having a second value. The gaming engine 108 may compare two or more playlists by comparing the competition profiles associated with each song of each playlist. A result of the comparison may be that the gaming engine 108 may determine a winning song and/or a winning playlist.

Figure 2:
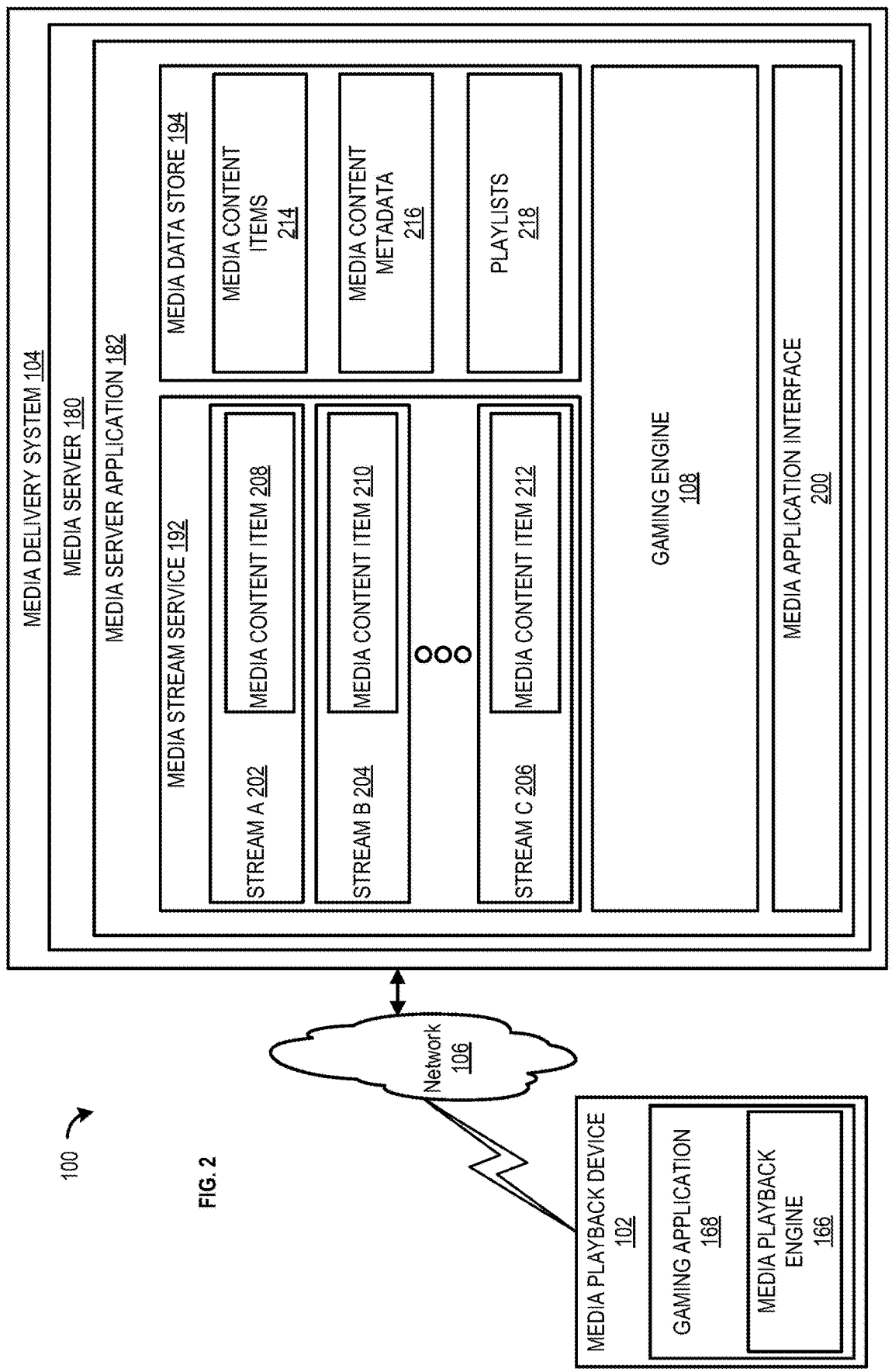
FIG. 2 is a block diagram illustrating an example system.

FIG. 2 is a schematic illustration of the system 100 for media content gaming. The system 100 includes the media-playback device 102, the media-delivery system 104, and network 106.

The media-playback device 102 operates to play media content items. In some embodiments, the media-playback device 102 operates to play media content items that are provided (e.g., streamed, transmitted, etc.) by a system external to the media-playback device 102 such as the media-delivery system 104, another system, or a peer device. For example, the system external to the media-playback device may comprise a streaming service such as Spotify® or iTunes®. Alternatively, in some embodiments, the media-playback device 102 operates to play media content items stored locally on the media-playback device 102. Further, in at least some embodiments, the media-playback device 102 operates to play media content items that are stored locally as well as media content items provided by a system external to the media-playback device 102.

The media-playback device 102 operates to play media content items to produce media output. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, media player, stereo, or radio.

The media-playback device 102 operates to store data and instructions. In some embodiments, the media-playback device 102 stores instructions for a gaming application 168 that includes a media-playback engine 166. In some embodiments, the gaming application 168 operates to enable a competition between two or more playlists of media content items and the media-playback engine 166 operates to playback the media content items. The gaming application 168 may be configured to interface with the media server 180 through the media application interface 200 in order to send and/or receive data to/from the gaming engine 108.

The network 106 may comprise a network access device. The network access device may operate to communicate with other computing devices over one or more networks, such as the network 106. Examples of the network access device include wired network interfaces and wireless network interfaces. Wireless network interfaces includes infrared, BLUETOOTH wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH, ultra-wideband (UWB), 802.11/b/g/n/ac, ZIGBEE, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Furthermore, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180. In at least some embodiments, the media server 180 is provided by multiple computing devices. For example, the media server 180 may be provided by multiple redundant servers located in multiple geographic locations. As an additional example, the various functions of the media server 180 may be provided by multiple heterogeneous servers.

The media server 180 operates to stream media content items to media-playback devices such as the media-playback device 102. In some embodiments, the media server 180 includes a media server application 182. In some embodiments, the media server application 182 operates to stream music or other audio, video, or other forms of media content. The media server application 182 includes a media stream service 192, a media data store 194, a game engine 108, and a media application interface 200.

In some embodiments, multiple servers provide various components of the media server application 182. For example, in some embodiments, separate heterogeneous servers operate to provide each of the media stream service 192, the media data store 194, the game engine 108, and the media application interface 200.

The media stream service 192 operates to buffer media content such as media content items 208, 210, and 212 for streaming to one or more streams 202, 204, and 206.

In some embodiments, the media data store 194 stores media content items 214, media content metadata 216, and playlists 218. The media data store 194 may comprise one or more databases and file systems. Other embodiments are possible as well. As noted above, the media content items 214 may be audio, video, or any other type of media content, which may be stored in any format for storing media content.

The media content metadata 216 operates to provide various information associated with the media content items 214. In some embodiments, the media content metadata 216 includes one or more of title, artist name, album name, length, and the like. The media content metadata 216 may also include one or more characteristics of each media content item 214. The one or more characteristics may comprise one or more of, mood, genre, popularity, acousticness, danceability, energy, loudness, speechiness, tempo, valence, key confidence, loudness, or valence.

The playlists 218 operate to identify one or more of the media content items 214. In some embodiments, the playlists 218 identify a group of the media content items 214 in a particular order. In other embodiments, the playlists 218 merely identify a group of the media content items 214 without specifying a particular order.

The gaming engine 108 operates to retrieve and/or determine one or more characteristics for media content items 214, generate a competition profile for media content items 214, and compare two or more media content items 214 by comparing the competition profiles associated with each of the two or more media content items 214. Aspects of the gaming engine 108 are illustrated and described with respect to FIG. 3.

The media application interface 200 can receive requests or other communication from media-playback devices 102 or other systems, to retrieve media items from the media server 180.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems.

In at least some embodiments, the media-delivery system 104 can be used to stream, progressively download, or otherwise communicate music, other audio, video, or other forms of media content items to the media-playback device 102 based on a request from the media-playback device 102 to retrieve or playback media content.

Figure 3:
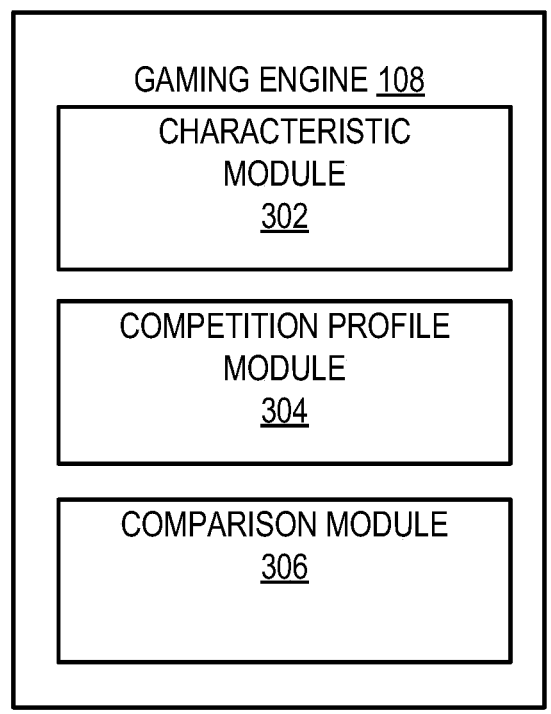
FIG. 3 is a block diagram illustrating an example gaming engine

FIG. 3 is a block diagram depicting an example view of the gaming engine 108. The gaming engine 108 can comprise one or more of, a characteristic module 302, a competition profile module 304, and a comparison module 306. The characteristic module 302 may receive/retrieve one or more characteristics for a given media content item 214 from another system. For example, a system external to the media delivery system 104 (e.g., a third party system) may have determined the one or more characteristics for a given media content item 214 and made such characteristics accessible through an application programming interface (API). Accordingly, the characteristic module 302 may obtain such one or more characteristics and store the one or more characteristics as media content metadata 216 in the media data store 194. In an embodiment, the characteristic module 302 may be provided with login credentials for an account with a third party system. The characteristic module 302 may automatically log in to the third party system using the login credentials and retrieve a token. The characteristic module 302 may then use the token to fetch characteristics of one or more specific media content item according to an identifier associated with the one or more specific media content items.

In another embodiment, the characteristic module 302 may determine the one or more characteristics. As used herein, characteristics of a media content item may include, for example, features related to rhythmic timing (e.g., tempo, beat, beats per minute, tatum, rhythm or the like), features related to sound quality (e.g., timbre, pitch, key, mode, volume, loudness or the like), features related to harmonic complexity (e.g., key, mode, pitch or the like), features related to musical preference (e.g., genre, style, artist, artist location, artist familiarity or the like), or features related to subject perception of the music (e.g., hotness, danceability, energy, liveness, speechiness, acousticness, valence, mood or the like). In some embodiments, danceability may be determined based at least in part on tempo, rhythm stability, beat strength, and/or regularity of the music. In some embodiments, energy represents the intensity or activity of the music, and may be determined based at least in part on dynamic range, loudness, timbre, onset rate, and/or general entropy of the music. In some embodiments, liveness represents the presence of an audience in the music. In some embodiments, speechiness represents the presence of spoken words in the music. In some embodiments, acousticness represents the extent to which the music was created using acoustic (rather than electronic) techniques. In some embodiments, valence represent the positivity (e.g., happiness, cheerfulness, euphoria or the like) conveyed by the music.

Characteristics may include, for example, simple features relating to fundamental structural elements of music (e.g., key, tempo, pitch, etc.) or complex features that result from combining two or more simple features (e.g., groove, danceability, energy, etc.).

Characteristics may include, for example, low-level audio features. In some embodiments, low-level audio features include standardized low-level features described in the MPEG-7 standard (MPEG-7 Multimedia Content Description Interface Parts 1-14, IS O/IEC 15938, which is hereby incorporated by reference to the maximum extent permitted by applicable law). In some embodiments, low-level audio features include features directly extracted from a digitized audio signal (e.g., from independently processed frames of a digitized audio signal). Some non-limiting examples of low-level audio features include Mel-Frequency Cepstral Coefficients (MFCC), Audio Spectrum Envelope (ASE), Audio Spectrum Flatness (ASF), Linear Predictive Coding Coefficients, Zero Crossing Rate (ZCR), Audio Spectrum Centroid (ASC), Audio Spectrum Spread (ASS), spectral centroid, spectral rolloff, and/or spectral flux.

Characteristics may include, for example, "compound" or "high-level" features. In some embodiments, compound features include features that can be directly perceived by humans. In some embodiments, a compound audio feature includes a combination of one or more low-level audio features, one or more sound-quality audio features, and/or one or more harmonic complexity audio features. Some non-limiting examples of compound features include tempo, timbre, rhythm, structure, pitch, beats per minute, and melody.

Example characteristics determined by some embodiments include an average duration of a musical event such as a single note or other musical event, a tempo regularity, a percussivity, and a beat strength. In some embodiments, the average duration of a musical event is calculated in various ways, including by dividing a total number of musical events in a media content item by a duration of the media content item. The tempo regularity corresponds to the consistency of the beat in a media content item. In some embodiments, the tempo regularity is based on calculating a standard deviation or variance value for measurements of the tempo over multiple intervals of a media content item. The percussivity corresponds to the strength or contribution of percussive instruments (or synthesized equivalents) to the media content item. The beat strength is proportional to the loudness of musical events that happen in correspondence to a beat. Some embodiments also include other characteristics such as indirect qualities that are determined by other machine learning models. For example, some embodiments include an energy characteristic that is calculated by a machine learning model trained to rate the relative energy levels of various media content items similarly to a user's rating. Other embodiments determine additional, different, or fewer characteristics. In some embodiments, the set of characteristics that are used are determined manually (e.g., through a user interface in which a user identifies at least one characteristic of interest). Alternatively, in some embodiments, deep learning techniques are used to select characteristics. Deep learning techniques may comprise the use of artificial neural networks to analyze the audio signals of training examples and identify characteristics that are useful in classifying media content items.

In some embodiments, the characteristic module 302 is configured to use machine learning to determine characteristics. The characteristic module 302 may operate to acquire training examples of media content items having a particular characteristic that can be used to train a model to identify the characteristic. In some embodiments, the training examples are labeled as having or not having particular characteristics. In some embodiments, the label is a Boolean indicator that indicates that the media content item does or does not have a particular characteristic. Additionally, in some embodiments, the label includes a score or value, such as a numeric value, that corresponds to how strongly the media content item embodies the particular characteristic. The characteristic module 302 operates to build one or more models that can be used to identify media content items that are likely to have a particular characteristic. In various embodiments, the characteristic module 302 uses one or more machine learning techniques to build the models. In some embodiments, one or more machine learning techniques are used to generate the model. Example machine learning techniques include variational Bayes Gaussian mixture models, support vector machines, artificial neural networks, k-means clustering, logistic regression, latent dirichlet allocation, spectral hashing, and other machine learning techniques.

Whether the characteristic module 302 retrieves/receives the one or more characteristics and/or determines the one or more characteristics, each characteristic may have a score for a media content item. The score may, for example, range from 0-1. Each media content item may have a plurality of characteristics and therefore a plurality of scores. All the scores for a given media content item may be combined to generate a combined score for a media content item. A score of a characteristic may be weighted. In some embodiments, combining the received scores comprises weighting each of the received scores and calculating a weighted average based on the weighted received scores. For example, the received scores may be weighted based on an average distribution of each characteristic.

FIG. 4 shows an example weighting strategy. A sample number of media content items for a genre may be determined. A plurality of characteristic scores may be obtained for each media content item. An average score for each characteristic score may be determined. FIG. 4 shows seven genres: Dance—(EDM—Electronic Dance Music) Techno, Dance—(EDM—Electronic Dance Music) Trance, Dance—(EDM—Electronic Dance Music) Trap, Disney, Easy Listening Bop, Easy Listening Lounge, and Easy Listening Swing. FIG. 4 shows a set of characteristics: acousticness, danceability, energy, instrumentalness, liveness, speechiness, and valence. The average score for the sample number of media content items are shown and the total of the average scores for each genre are shown. The weights may be determined by dividing each average score for a genre into the sum of the average scores for the genre. For example, for the genre Easy Listening Bop, the average score for acousticness is 0.631, the total of the average scores for Easy Listening Bop is 2.95. The weight for acousticness for Easy Listening Bop may be determined by dividing 0.631 by 2.95, resulting in the weight of 0.21, or 21%.

Returning to FIG. 3, the comparison module 306 may determine and compare competition scores between any number of media content items. In an embodiment, the comparison module 306 may determine and compare competition scores between two sets of media content items, wherein each set of media content items represents a playlist 218 generated by one or more users. The playlists 218 may be retrieved from the media data store 194. The playlists 218 may be generated by a user of the media playback device 102. Once the characteristic module 302 has determined characteristic scores for a media content item and weights determined for a genre associated with the media content item, the competition profile module 304 can generate a competition profile for the media content item.

FIG. 5 shows an example competition profile 500. The example competition profile 500 indicates a name for the media content item, "Lux Aurumque." The example competition profile 500 indicates a genre for the media content item, "Classical Choral." The example competition profile 500 indicates a release date for the media content item, "Jan. 1, 2010." The example competition profile 500 indicates a popularity ranking for the media content item, "45." The popularity ranking may be associated with various information. For example the popularity ranking may be associated with temporal information such as the date or time a song debuted on the radio or a streaming platform or on-demand platform. As a further example, temporal information may comprise a date or time when an album featuring the song was released. The temporal information may be stored in a database or file system or the like. The popularity ranking may comprise a value. The popularity ranking may comprise a frequency, for example a frequency associated with streaming or a frequency associated with radio-play or requests for on-demand content. Popularity may be based on the frequency of plays and newness of a track. For example, older tracks may have less popularity than newer tracks. As such, a track's release data may be considered in its popularity. The example competition profile 500 indicates an identifier for the media content item, "XK31K455UYT," that may be provided by the media stream service 192 to identify and stream the media content item to the media playback device 102. The example competition profile 500 indicates the scores for each characteristic determined for the media content item and associated weights for each characteristic determined for the genre. The competition module may generate any number of competition profiles. A media content item may have more than one competition profile. The competition profiles may be stored as media content metadata 216 on media data store 194.

Returning to FIG. 3, the comparison module 306 may be provided with two or more identifiers of two or more media content items and retrieve the competition profile associated with the two or more media content items. If no competition profile exists for a media content item, the comparison module 306 may provide the identifier to the characteristic module 302 and/or the competition module 304 to determine characteristic scores for the media content item and generate a competition profile for the media content item. Once the competition profiles are retrieved and/or determined, the comparison module 306 may multiply each characteristic by that characteristic's associated weight and sum the resulting products according to Equation 1:

$$\Sigma_{i=0}^{n} score_i * weight_i$$

wherein i=position in an array of characteristics, n=the last position in the array of characteristics, $score_i$=the score of the characteristic at position i, and $weight_i$=the weight of the genre at position i. The result of equation 1 may be divide by sum of the weights of the genre for the media content item according to Equation 2:

$$\sum_{i=0}^{n} weight_i$$

Thus, a competition score may be determined according to Equation 3:

$$\frac{\sum_{i=0}^{n} score_i * weight_i}{\sum_{i=1}^{n} weight_i}$$

The competition scores for each media content may be determined and compared. The media content item having the highest competition score may be identified as a winning media content item.

FIG. 6 shows an example result of the comparison module 306 determining competition scores for two media content items based on competition profiles. The two media content items to be compared are: Lux Aurumque and Firestone (feat. Conrad Sewell). The characteristic scores for each media content item are shown, along with the weights for genres to which the media content items belong. The result of entering the respective characteristic scores and weights into Equation 3 results in a competition score of 0.878280699 for Lux Aurumque and a competition score of 0.310246476 for Firestone (feat. Conrad Sewell). The competition score for Lux Aurumque is greater than the competition score for Firestone (feat. Conrad Sewell, thus making Lux Aurumque the winner.

Figure 7:
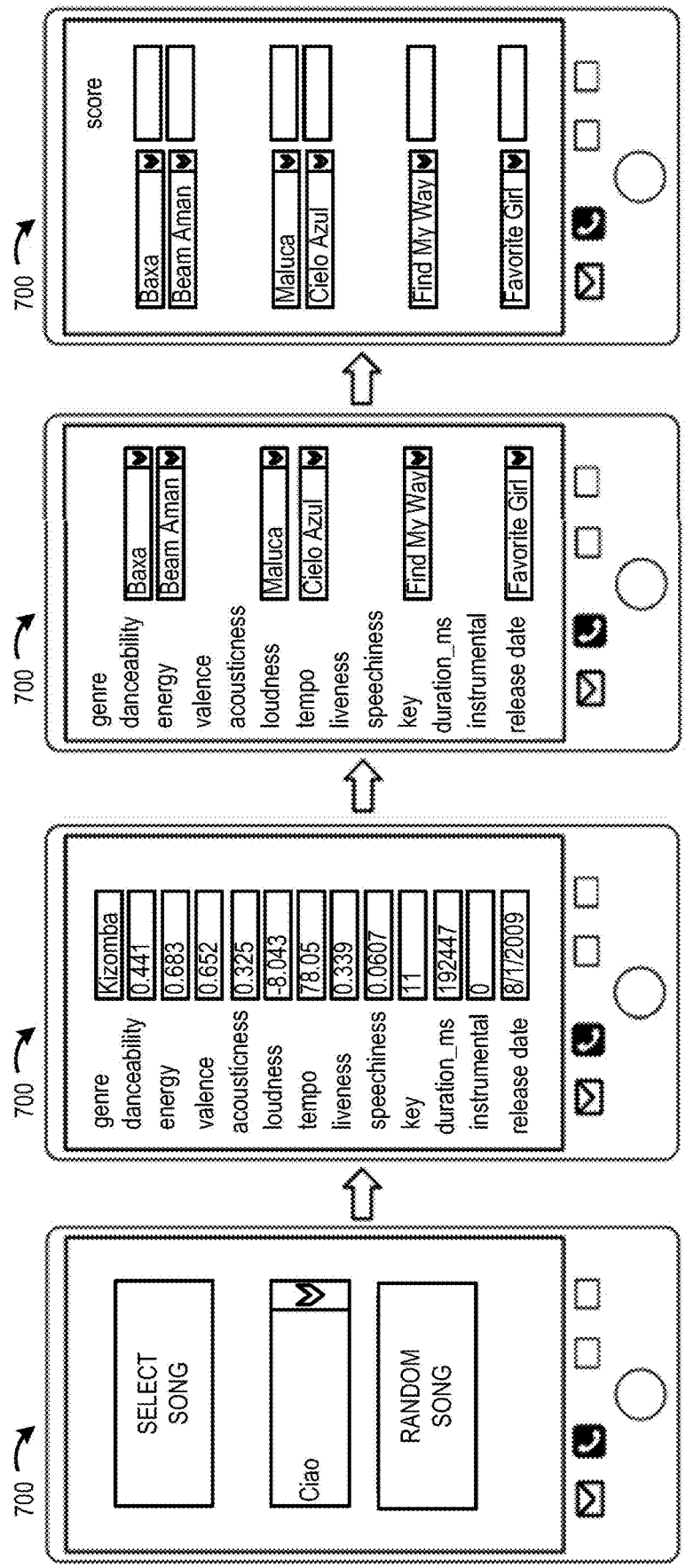
FIG. 7A is an example of an embodiment of a user interface.
FIG. 7B is an example of an embodiment of a user interface.
FIG. 7C is an example of an embodiment of a user interface.
FIG. 7D is an example of an embodiment of a user interface.

FIG. 7A shows an example interface 700 for the gaming application 110 resident on the media playback device 102. The interface may facilitate the selection of a song. Songs may be selected from a list or a database. For example, the interface 700 may comprise a field configured to receive an input. For example, a user may type a song title, artist, genre, or any other information into the field. The user input may cause a song to be retrieved from the database. In an embodiment, a user may input a "random song" command. The random song command may cause a random song to be retrieved from the database.

FIG. 7B shows an example interface 700 for the gaming application 110 resident on the media playback device 102. The interface may display values or scores associated with one or more characteristics of the selected content item. For example, the one or more characteristics may comprise information related to one or more of: genre, danceability, energy, valence, acousticness, loudness, tempo, liveness, speechiness, key, duration, instrumentalness, release date, artist, combinations thereof, and the like.

FIG. 7C shows an example interface 700 for the gaming application 110 resident on the media playback device 102. The interface 700 may display additional information related to the content item.

FIG. 7D shows an example interface 700 for the gaming application 110 resident on the media playback device 102. The interface may display fields related to or associated with the information associated with the content item. For example, the interface 700 may display information such as a score related to one or more of: genre, danceability, energy, valence, acousticness, loudness, tempo, liveness, speechiness, key, duration, instrumentalness, release date, artist, combinations thereof, and the like.

Figure 8:
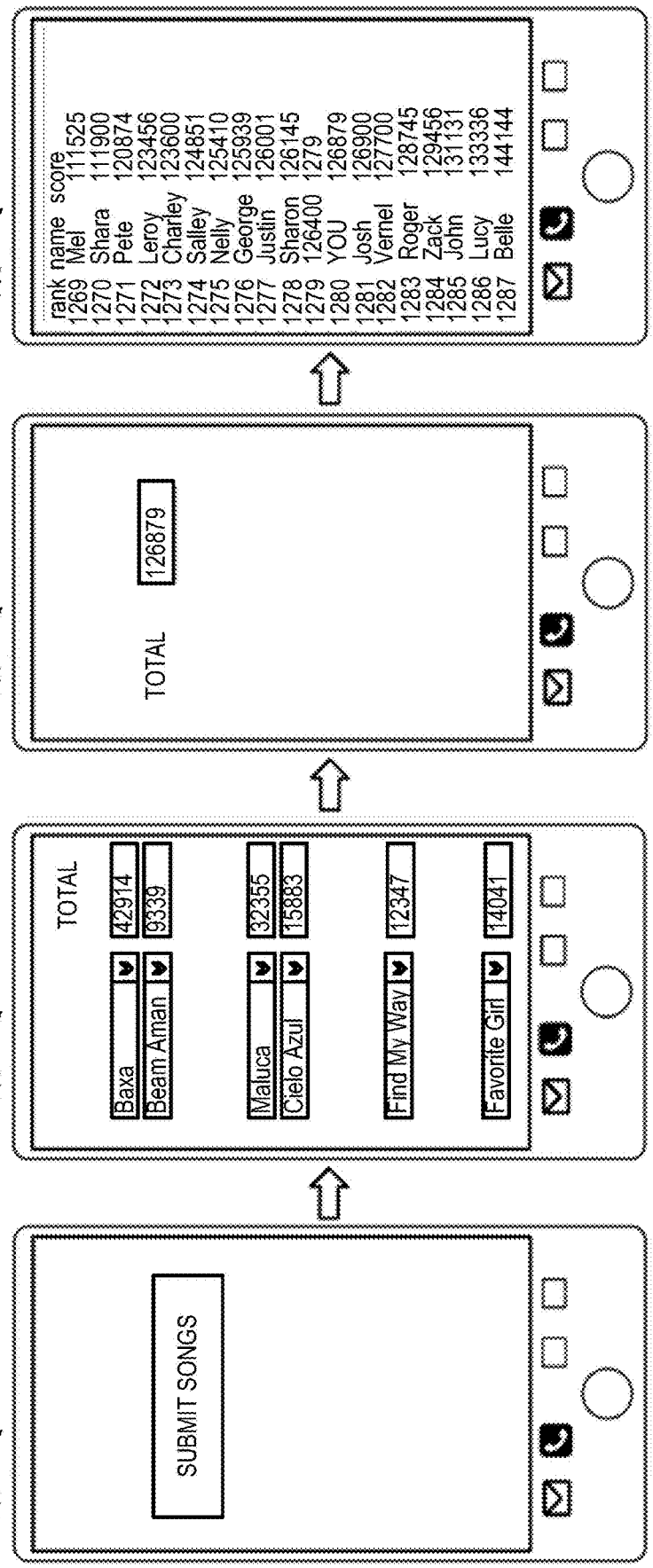
FIG. 8A is an example of an embodiment of a user interface.
FIG. 8B is an example of an embodiment of a user interface.
FIG. 8C is an example of an embodiment of a user interface.
FIG. 8D is an example of an embodiment of a user interface.

FIG. 8A shows an example interface 700 for the gaming application 110 resident on the media playback device 102. Songs may be submitted via the interface 700. For example, the interface 700 be configured to facilitate the submittal of one or more songs. For example, the interface 700 may configured to present a selectable option. The selectable option may comprise, for example, a "submit song" option. By selecting the submit song option, a user may submit a song for competition. That is to say, the user may submit the song for competition against another song submitted by another user.

FIG. 8B shows an example interface 700 for the gaming application 110 resident on the media playback device 102. The interface 700 may display information associated with at least one piece of content.

FIG. 8C shows an example interface 700 for the gaming application 110 resident on the media playback device 102. The interface 700 may display a score associated with the piece of content.

FIG. 8D shows an example interface 700 for the gaming application 110 resident on the media playback device 102. The interface 700 may display scores or ranks or names or other information associated with a user.

Figure 9:
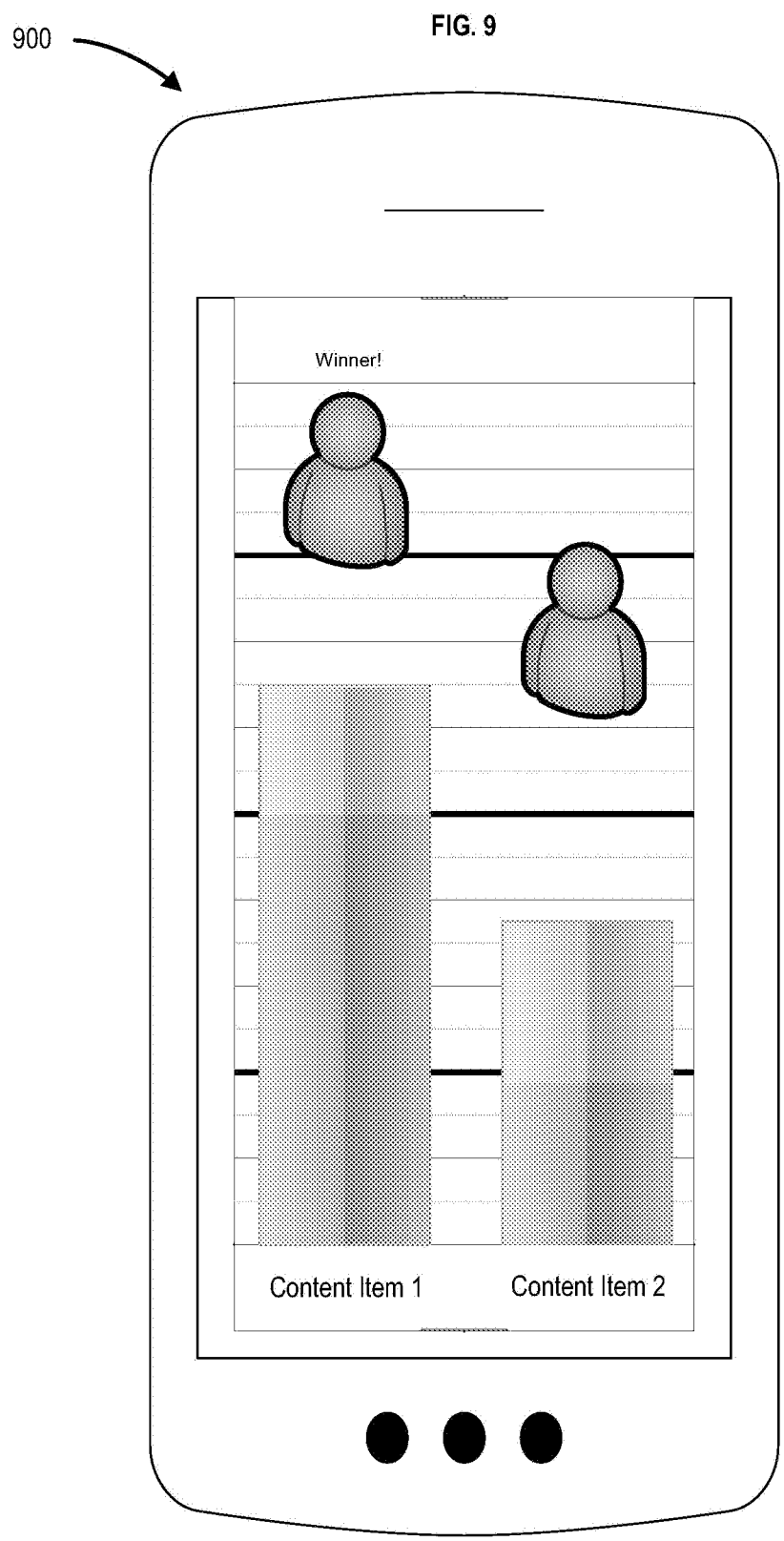
FIG. 9 shows an example method.

FIG. 9 shows an example interface 700 for the gaming application 110 resident on the media playback device 102. The interface may display a "sporting visualization." The interface 700 may display icons or figures or other graphical representations and the like so as to represent values or scores associated with content items in relative terms (e.g., non-numerical terms) such that it is apparent which content has won the comparison. For example, the final score for a content item associated with a user may be greater than the final score for a content item associated with a different user. As such, a first figure on a playing field associated with the content item associated with the first user may, or a progress bar associated with the first user, may advance farther down the field than a figure or progress bar associated with a second user associated with a second content item, thereby indicating which content item has a greater score.

Figure 10A:
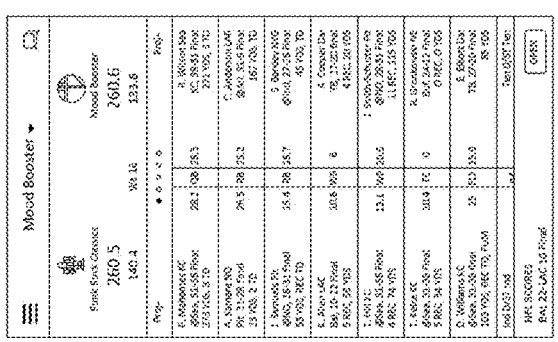
FIGS. 10A-10F show example gameplay visualizations.

FIGS. 10A-10F show example sporting visualizations. The sporting visualization may comprise images and/or video of sporting contests. For example, the sporting contest may be any sport. For example, the sporting contest may be a track and field event, a multiplayer sporting event (e.g., American football), or any other competitive event. The following examples are directed to an embodiment wherein an American Football contest is shown. However, the following example is merely exemplary and explanatory and is not meant to be limiting. A person skilled in the art will appreciate that any competition or sporting event may be used. In FIG. 10A, the sporting visualization may comprise one or more playlists. The one or more playlist may comprise any number of songs. The one or more playlists may comprise a first playlist and a second playlist as described below with respect to FIG. 10B.

Figure 10C:
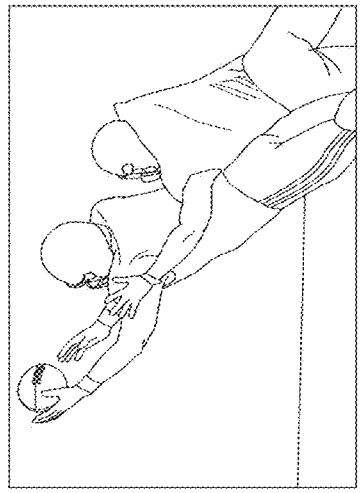
Figure 10B:
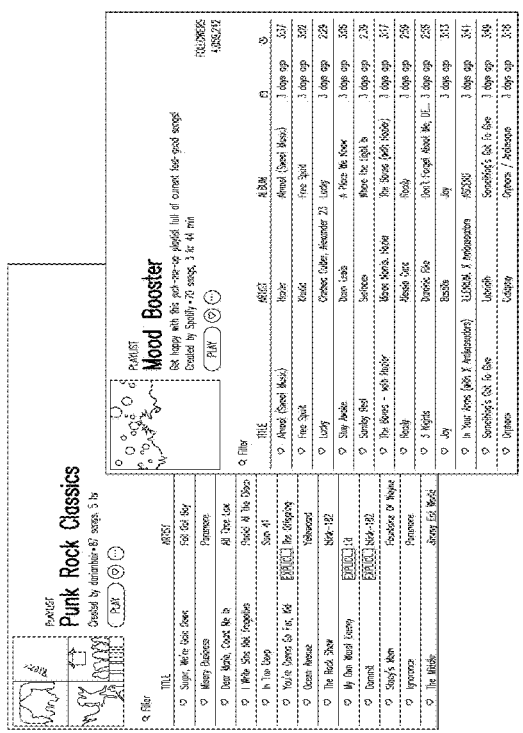

FIG. 10B shows an example sporting visualization. The sporting visualization may comprise two playlists. For example, a first playlist may be titled "Punk Rock Classics." For example, the second playlist may be titled "Mood Booster." The first playlist may be generated and submitted by a first user (e.g., a first player). The second playlist may be generated and submitted by a second user (e.g., a second player).

In the context of a sporting visualization associated with a team sport, each song in a playlist may be associated with, for example, a figure in the sporting visualization. For example, in the context of American Football, an 11 song playlist may correspond to the 11 players on a field for a given team. For example, a first user may build a playlist featuring a first set of 11 songs. A second user may build a playlist featuring a second set of 11 songs. The first set of 11 songs may correspond to a team on offense while the second set of 11 songs may correspond to a team on defense. As such, each song of the first set of 11 songs will correspond to a respective player on offense while each song of the second set of 11 songs will correspond to a player on defense. As play on the field progresses, various songs may "face-off" or "match-up." As such, the parameters of the song competition may correspond to the rules of a sport.

FIG. 10C shows an example sporting visualization. In FIG. 10C, the songs of the playlists shown in FIG. 10B have been converted to corresponding players on a football roster. For example, a first song on the first playlist may be shown as a first player on a first roster. Likewise, a second song on a second playlist may be shown as a second player on a second roster. While FIG. 10C shows player names, it is to be understood the sporting visualization may show song titles, artists, release dates, genres, acousticness, danceability, energy, loudness, speechiness, tempo, valence, key confidence, loudness, combinations thereof, and the like.

Figure 10F:
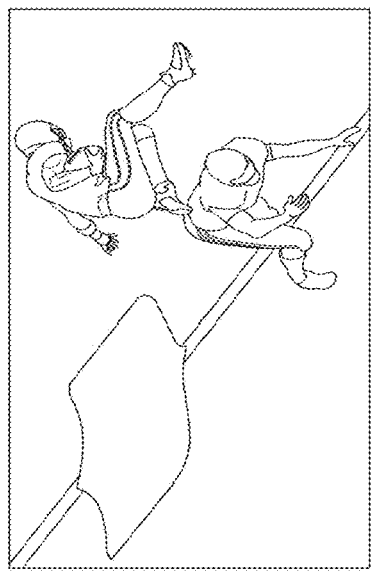
Figure 10D:
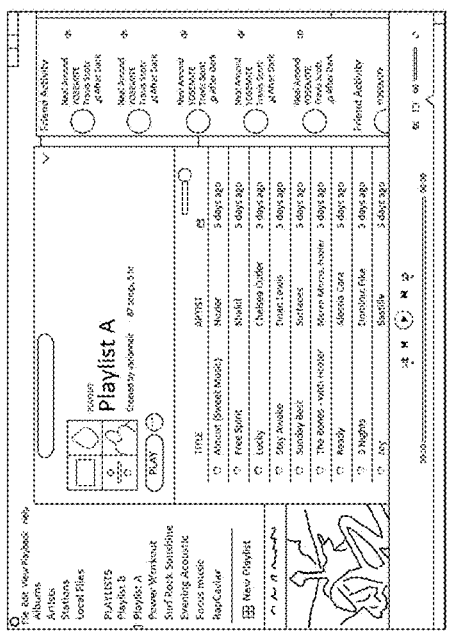

FIG. 10D shows an example sporting visualization. For example, in FIG. 10D, an offense and a defense is shown. The offense may correspond to the first playlist while the defense may correspond to the second playlist. As such, the sporting visualization may display, in real time, the first and second playlists as they face off against each other. For example, when the competition begins, the offense players (corresponding to the first playlist) may begin to interact with the defensive players (corresponding to the second playlist) and, as the respective songs face off, the players may interact as described below. For example, the first user and the second user may determine song rules. For example, in a given contest, a certain parameter may be weighted or deemed more valuable than others. Likewise, the rules determined by the first user and the second user may correspond to sport rules and/or player characteristics. For example, a first song may have a high danceability score. In a given contest, or in relation to a given player, this high danceability score correspond to, for example, the speed of a running back or the throwing accuracy of a quarterback. Similarly, a second song may have a low danceability score but a high valence score. The high valence score may correspond to the speed or jumping ability of a tight end. Thus, in the example of a football game, the first song (the quarterback), may face off against the second song (the tight end). Thus, when the quarterback throws the ball, his accuracy will be high, but so too will be the jumping ability of the tight end. The song with the highest score will prevail. Thus, if the danceability of the first song is greater than the valence of the second song, the pass will be completed.

Figure 10E:
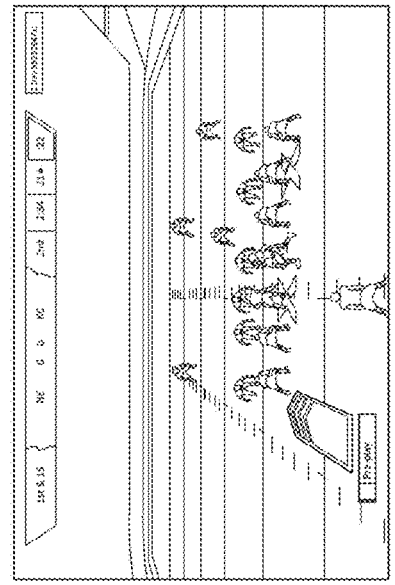

For example, in FIG. 10E, a first song (from the first set or playlist that is associated with the team on offense) may be associated with a running back on offense while a second song (e.g., from the second set or playlist that is associated with the team on defense) may correspond to a cornerback. As the songs face off, or compete, so do the players on the screen. For example, in FIG. 10E, the running back is shown hurtling over the cornerback. That is to say, the song associated with the running back is beating the song associated with the cornerback. As such, the running back appears to defeat the cornerback and thus advances the ball down the playing field.

For example, in FIG. 10F, a first song (from the first set or playlist that is associated with the team on offense) may be associated with a wide receiver on offense while a second song (e.g., from the second set or playlist that is associated with the team on defense) may correspond to a tight-end or cornerback. As the songs face off, or compete, so do the players on the screen. For example, in FIG. 10F, the wide receiver is shown catching a thrown ball while the tight end attempts to prevent the catch. In this example, the song associated with the wide receiver is beating the song associated with the tight end and therefore, as the song associated with the wide receiver beats the song associated with the tight end, the pass is caught, and the ball is advanced down the field of play.

FIG. 11 shows an example method 1100. The method 1100 may comprise, receiving a data file comprising one or more a media content items at 1110. The media content item may comprise one or more of a song or a video.

The method 1100 may comprise determining one or more characteristics of the media content item at 1120. The one or more characteristics may comprise one or more of, popularity, acousticness, danceability, energy, loudness, speechiness, tempo, valence, key confidence, loudness, or valence. Determining the one or more characteristics of the song may comprise converting the data file into a waveform, comparing the waveform to a plurality of predetermined waveforms, wherein the plurality of predetermined waveforms have been assigned a value for each of the one or more characteristics, determining a matching waveform of the plurality of predetermined waveforms, and assigning the value of the characteristic of the predetermined waveform as the value of the characteristic of the song.

The method 1100 may comprise assigning a value to each of the one or more characteristics at 1130.

The method 1100 may comprise generating a competition profile for the media content item at 1140. Generating the competition profile for the song may comprise storing each assigned value for each characteristic in an array.

The method 1100 may comprise associating the competition profile with the data file at 1150. The method 1100 may further comprise assembling a plurality of competition profiles into a first roster. The method 1100 may further comprise receiving a second roster and determining, based on comparing the first roster to the second roster, a winning roster. Determining, based on comparing the first roster to the second roster, the winning roster may comprise comparing a value of each characteristic of a first song of the first roster to a corresponding value of the characteristic of a first song of the second roster, attributing a win to the song having a greater number of characteristics with greater values, repeating a-b for each song of the first roster and the second roster, and attributing a win to the roster having a greater number of songs with wins. The method 1100 may further comprise associating one or more points to the winning roster.

Determining, based on comparing the first roster to the second roster, the winning roster may comprise streaming a first song of the first roster, streaming a first song of the second roster, generating a first graphical object for the first song of the first roster, generating a second graphical object for the second song of the second roster, displaying the first graphical object and the second graphical object on a simulated sports field, as both the first song and the second song are streamed, determining which of the first song or the second song has a greater number of characteristics with greater values, and advancing either the first graphical object or the second graphical object toward a goal of the simulated sports field based on which of the first song or the second song has a greater number of characteristics with greater values. The method 1100 may further comprise determining the winning roster based on which graphical object reaches the goal of the simulated sports field first.

Figure 12:
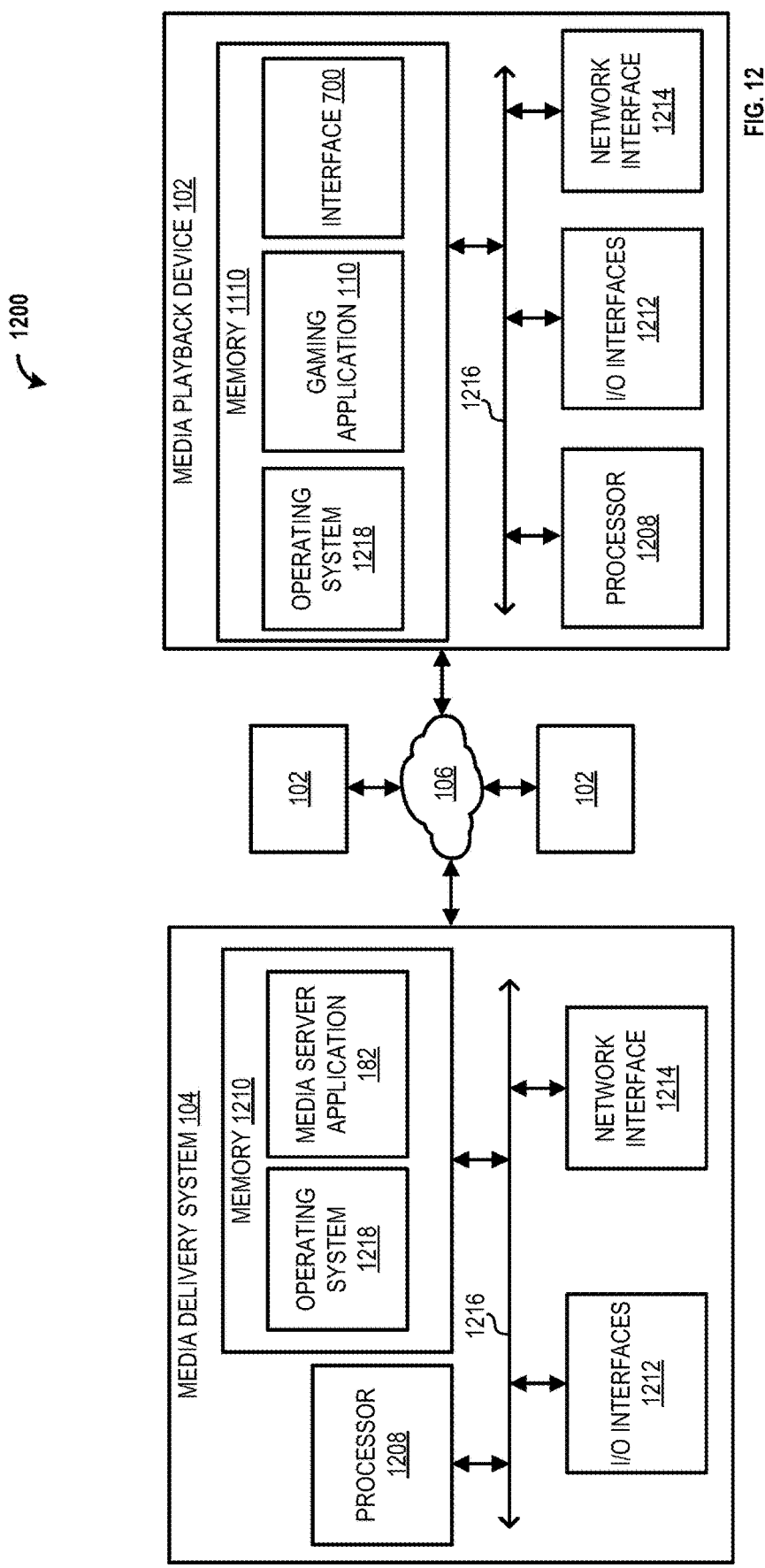
FIG. 12 is an example of an environment in which the present systems and methods may operate.

FIG. 12 is a block diagram depicting an environment 1200 comprising non-limiting examples of the media delivery system 104 and the media playback device 102 connected through the network 106. In an aspect, some or all steps of any described method may be performed on a computing device as described herein. The media delivery system 104 can comprise one or multiple computers configured to store one or more of the media server application 182, the media content items 214, the media content metadata 216, the playlists 218, the gaming engine 108, and the like. The media playback device 102 can comprise one or multiple computers configured to store one or more of the gaming application 168 and/or the media playback engine 166 and to operate the user interface 700 (e.g., via a web browser) such as, for example, a mobile phone, a tablet computer, a laptop computer, or a desktop computer. Multiple media playback devices 102 can connect to the media delivery system 104 through the network 106 such as, for example, the Internet. A user on a media playback device 102 may connect to the media server application 182 with the user interface 700. In an aspect, one or more of the media server application 182, the media content items 214, the media content metadata 216, the playlists 218, and/or the gaming engine 108 may be resident on the media playback device 102.

The media delivery system 104 and the media playback device 102 can be a digital computer that, in terms of hardware architecture, generally includes a processor 1208, memory system 1210, input/output (I/O) interfaces 1212, and network interfaces 1214. These components (1208, 1210, 1212, and 1214) are communicatively coupled via a local interface 1216. The local interface 1216 can be, for example but not limited to, one or more buses or other wired or wireless connections, as is known in the art. The local interface 1216 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1208 can be a hardware device for executing software, particularly that stored in memory system 1210. The processor 1208 can be any custom made or commercially available processor, a central processing unit (CPU), an auxiliary processor among several processors associated with the media delivery system 104 and the media playback device 102, a semiconductor-based microprocessor (in the form of a microchip or chip set), or generally any device for executing software instructions. When the media delivery system 104 and the media playback device 102 is in operation, the processor 1208 can be configured to execute software stored within the memory system 1210, to communicate data to and from the memory system 1110, and to generally control operations of the media delivery system 104 and the media playback device 102 pursuant to the software.

The I/O interfaces 1212 can be used to receive user input from and/or for providing system output to one or more devices or components. User input can be provided via, for example, a keyboard and/or a mouse. System output can be provided via a display device and a printer (not shown). I/O interfaces 1212 can include, for example, a serial port, a parallel port, a Small Computer System Interface (SCSI), an IR interface, an RF interface, and/or a universal serial bus (USB) interface.

The network interface 1214 can be used to transmit and receive from the media delivery system 104 or the media playback device 102 on the network 106. The network interface 1214 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 1214 may include address, control, and/or data connections to enable appropriate communications on the network 1204.

The memory system 1210 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1210 may incorporate electronic, magnetic, optical, and/or other types of storage media. Note that the memory system 1210 can have a distributed architecture, where various components are situated remote from one another, but can be accessed by the processor 1208.

The software in memory system 1210 may include one or more software programs, each of which comprises an ordered listing of executable instructions for implementing logical functions. In the example of FIG. 12, the software in the memory system 1210 of the media delivery system 104 can comprise the media server application 182 (or subcomponents thereof) and a suitable operating system (O/S) 1218. In the example of FIG. 12, the software in the memory system 1210 of the media playback device 102 can comprise the user interface 700, the gaming application 110, and a suitable operating system (O/S) 1218. The operating system 1218 essentially controls the execution of other computer programs, such as the operating system 1218, the media server application 182, the gaming application 110, and/or the user interface 700, and provides scheduling, input-output control, file and data management, memory management, and communication control and related services.

For purposes of illustration, application programs and other executable program components such as the operating system 1218 are illustrated herein as discrete blocks, although it is recognized that such programs and components can reside at various times in different storage components of the media delivery system 104 and/or the media playback device 102. An implementation of the media server application 182, the gaming application 110, and/or the user interface 700 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    converting a data file associated with a content item to a waveform;
    determining, based on the waveform, one or more characteristics of the waveform;
    determining, based on the one or more characteristics of the waveform, one or more characteristics of a matching waveform;
    assigning a value of a characteristic of the one or more characteristics of the matching waveform as the value of a characteristic of the content item; and
    generating, based on the value of the characteristic of the content item, a competition profile associated with the content item.

2. The method of claim 1, wherein the content item comprises a song.

3. The method of claim 1, wherein the one or more characteristics of the waveform comprise one or more of, popularity, acousticness, danceability, energy, loudness, speechiness, tempo, key confidence, loudness, or valence.

4. The method of claim 1, wherein generating the competition profile for the content item comprises storing each assigned value for each characteristic in an array.

5. The method of claim 1, further comprising assembling a plurality of competition profiles into a first roster.

6. The method of claim 5, further comprising:
    receiving a second roster; and
    determining, based on comparing the first roster to the second roster, a winning roster.

7. The method of claim 6, wherein determining, based on comparing the first roster to the second roster, the winning roster comprises:
    comparing a value of each characteristic of a first content item of the first roster to a corresponding value of the characteristic of a first content item of the second roster;
    attributing a win to the content item having a greater number of characteristics with greater values; and
    attributing a win to a roster having a greater number of content items with wins.

8. An apparatus comprising:
    one or more processors; and
    a memory storing processor-executable instructions that, when executed by the one or more processors, cause the apparatus to:
        convert a data file associated with a content item to a waveform;
        determine, based on the waveform, one or more characteristics of the waveform;
        determine, based on the one or more characteristics of the waveform, one or more characteristics of a matching waveform;
        assign a value of a characteristic of the one or more characteristics of the matching waveform as the value of a characteristic of the content item; and
        generate, based on the value of the characteristic of the content item, a competition profile associated with the content item.

9. The apparatus of claim 8, wherein the content item comprises a song.

10. The apparatus of claim 8, wherein the one or more characteristics comprise one or more of, popularity, acousticness, danceability, energy, loudness, speechiness, tempo, key confidence, loudness, or valence.

11. The apparatus of claim 8, wherein generating the competition profile for the content item comprises storing each assigned value for each characteristic in an array.

12. The apparatus of claim 8, wherein the processor-executable instructions, when executed by the one or more processors, further cause the apparatus to assemble a plurality of competition profiles into a first roster.

13. The apparatus of claim 12, further comprising:
    receiving a second roster; and
    determining, based on comparing the first roster to the second roster, a winning roster.

14. The apparatus of claim 13, wherein the processor-executable instructions, when executed by the one or more processors, further cause the apparatus to:
    compare a value of each characteristic of a first song of the first roster to a corresponding value of the characteristic of a first song of the second roster;
    attribute a win to a song having a greater number of characteristics with greater values; and
    attribute a win to a roster having a greater number of songs with wins.

15. One or more non-transitory computer-readable media storing processor-executable instructions that, when executed by at least one processor, cause the at least one processor to:
    convert a data file associated with a content item to a waveform;
    determine, based on the waveform, one or more characteristics of the waveform;
    determine, based on the one or more characteristics of the waveform, one or more characteristics of a matching waveform;

assign a value of a characteristic of the one or more characteristics of the matching waveform as the value of a characteristic of the content item; and generate, based on the value of the characteristic of the content item, a competition profile associated with the content item.

16. The one or more non-transitory computer-readable media of claim 15, wherein the content item comprises a song.

17. The one or more non-transitory computer-readable media of claim 15, wherein the one or more characteristics comprise one or more of, popularity, acousticness, danceability, energy, loudness, speechiness, tempo, key confidence, loudness, or valence.

18. The one or more non-transitory computer-readable media of claim 15, wherein the processor-executable instructions that, when executed by the at least one processor, cause the at least one processor to generate a competition profile, further cause the at least one processor to store each assigned value for each characteristic in an array.

19. The one or more non-transitory computer-readable media of claim 15, wherein the processor-executable instructions, when executed by the at least one processor, further cause the at least one processor to assemble a plurality of competition profiles into a first roster.

20. The one or more non-transitory computer-readable media of claim 19, wherein the processor-executable instructions, when executed by the at least one processor, further cause the at least one processor to:

receive a second roster; and determine, based on comparing the first roster to the second roster, a winning roster.

\* \* \* \* \*